Jan. 10, 1933.  W. L. DAWSON  1,894,023
CIRCUITS FOR PHOTO ELECTRIC CELLS
Filed Dec. 30, 1931
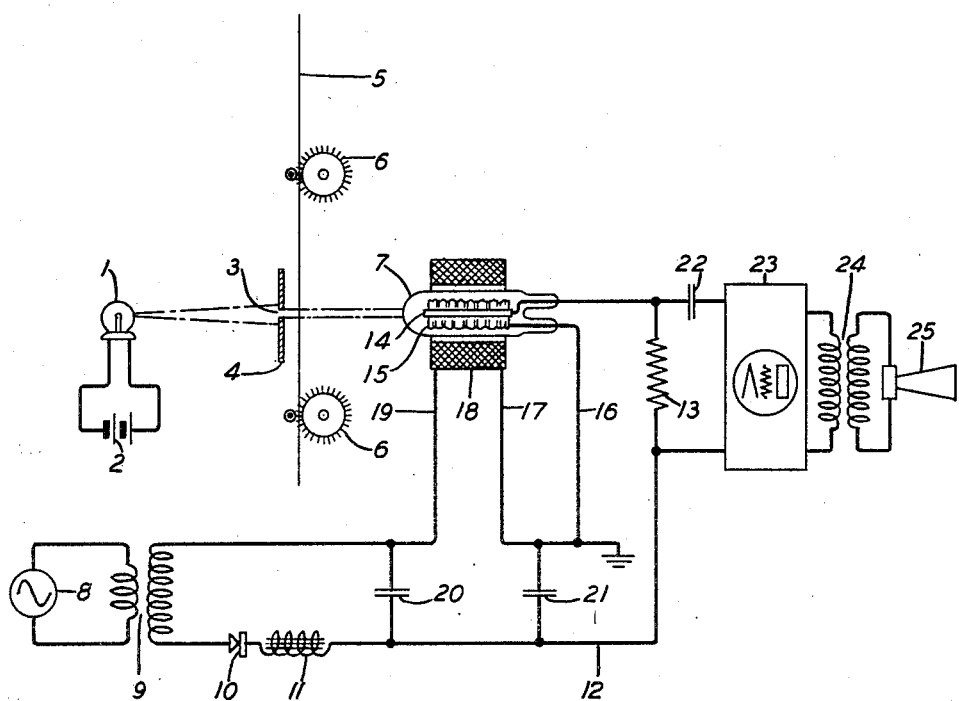
INVENTOR
W. L. DAWSON
BY
G. H. Heydt.
ATTORNEY Patented Jan. 10, 1933

1,894,023

UNITED STATES PATENT OFFICE

WILFRID L. DAWSON, OF NEW YORK, N. Y., ASSIGNOR TO BELL TELEPHONE LABORATORIES, INCORPORATED, OF NEW YORK, N. Y., A CORPORATION OF NEW YORK

CIRCUITS FOR PHOTO-ELECTRIC CELLS

Application filed December 30, 1931. Serial No. 583,999.

This invention relates to a method and means for operating a light sensitive device on rectified alternating current.

The object of the invention is to neutralize the variation in the output of a light sensitive device which would be produced by the alternating components in the rectified alternating components in the rectified alternating current.

A feature of the invention is an inductor forming one element of a filter associated with the rectifier and also directly modulating the current of the light sensitive device.

The polarizing potential applied to a light sensitive device has heretofore commonly been obtained from a source of steady potential, such as a storage battery. There are well known disadvantages attending the use of a storage battery and attempts have been made to replace the polarizing battery by a supply of rectified alternating current. Unless a very elaborate and expensive filter is associated with the rectifier, a small alternating component will be present in the output of the rectifier and filter and this component will cause a small variation in the output of the light sensitive device. As the output of a light sensitive device is commonly amplified to a very high degree, this small variation will also be highly amplified and may render the system unsuitable for many purposes.

An externally applied magnetic field will produce a modulation of the current of a light sensitive device such as a photoelectric cell, as shown in U. S. Patent 1,658,843 patented February 14, 1928 to F. Gray. In accordance with the present invention, an inductor forms one element of the filter associated with the rectifier. This inductor is arranged so that the magnetic field due to the inductor modulates the current of the light sensitive device. By suitably choosing the values of inductance and capacitance in the filter section, the phase and magnitude of the magnetic field may be adjusted so that the modulation produced neutralizes the variation which would be produced by the alternating component of the rectified current.

The drawing diagrammatically illustrates a preferred embodiment of the invention incorporated in a film sound reproducing system.

An electric incandescent lamp 1 is supplied with current from a suitable source 2. Light from the lamp 1 is directed on a small slot 3 in an opaque plate 4. The light passing through the slot 3 falls on a sound record impressed on a photographic film 5 moved at constant speed by the sprockets 6, 6 in the known manner. The light modulated by the sound record excites a light sensitive device 7, which may be a photoelectric cell or other similar device.

Alternating current from a suitable source 8 is supplied to the primary winding of a transformer 9. The current induced in the secondary winding of the transformer 9 is rectified by the rectifier 10 and the rectified current flows through the smoothing inductor 11, wire 12, resistor 13, anode 14 of photoelectric cell 7, through the cell to the cathode 15, wire 16, wire 17, winding of inductor 18 and wire 19 to the secondary winding of transformer 9. The series inductance of the inductor 11, and the inductor 18 combined with the shunt capacitance of the capacitors 20 and 21 form a low-pass electric filter which reduces the pulsations in the rectified current to a small value.

The modulated light falling on the photoelectric cell 7 causes the current flowing through the cell to vary, thus producing a potential difference between the ends of the resistor 13 which varies in accordance with the variation in the current. This varying potential difference is applied, through the condenser 22, to the input circuit of an amplifier 23. The amplified output of the amplifier 23 is supplied through a transformer 24 to a reproducing device 25.

Due to the high degree of amplification applied to the output of a photoelectric cell in modern sound reproducing equipments, the slight residual pulsation remaining in the filtered output of the rectifier is found to produce a disagreeable hum. In accordance with the invention, the inductor 18 is so disposed that the magnetic field of the inductor 18 is linked with the magnetic field created by the passage of the electrons from the cathode to the anode of the photoelectric cell 7. The magnetic field of the inductor 18 is pulsating slightly with the unrectified residual component of the rectified current. This pulsation in the magnetic field of the inductor 18 modulates the electron flow from the cathode 15 to the anode 14 and neutralizes the pulsation due to the residual component in the filtered voltage applied to the anode 14.

The inductor 18 may surround the photoelectric cell as shown, or may be disposed adjacent to the cell, for example, the inductor 18 may surround the socket in which the cell 7 is mounted.

What is claimed is:

1. In combination, a light sensitive device, a rectifier energized by alternating current, a circuit for supplying polarizing potential from said rectifier to said device, and a filter section in said circuit including an inductive element, the magnetic field of said element being arranged to modulate the current flowing in said device.

2. In combination, a light sensitive device, a rectifier energized by alternating current, a circuit for supplying polarizing potential from said rectifier to said device, and a filter section in said circuit including an inductive element, said element being so disposed that the magnetic field of said element will link with the magnetic field due to the current flowing in said device.

3. In combination, a light sensitive device, a rectifier energized by alternating current, a circuit for supplying polarizing potential from said rectifier to said device, and a filter section in said circuit including an inductive element, said element being so disposed that the magnetic field of said element is adjusted in magnitude and phase to neutralize the variations due to said alternating current in the current flowing in said device.

In witness whereof, I hereunto subscribe my name, this 29th day of December, 1931.

WILFRID L. DAWSON.